United States Patent Office 3,235,558
Patented Feb. 15, 1966

3,235,558
COMPLEX SALTS OF CERTAIN TRIAZOLES AND TETRAZOLES
Hugh T. Harrison, Tulsa, Okla., assignor to The Dow Chemical Company, Midland, Mich., a corporation of Delaware
No Drawing. Filed Sept. 21, 1964, Ser. No. 398,104
7 Claims. (Cl. 260—308)

The present invention is directed to organic chemistry and is directed, in particular, to a heterocyclic salt which is a mono-salt of, on the one hand, a member selected from the group consisting of hexafluoroarsenic acid and hexafluorophosphoric acid, and, on the other hand, a member selected from the group consisting of 3-amino-s-triazole, tetrazole, and 5-aminotetrazole. The compounds of the present invention are solid materials; they are useful as parasiticides for the control of a number of mite, insect, and helminth organisms, such as southern armyworm, and two-spotted spider mite. The compounds are also useful when employed as agents to inhibit the nitrification of ammonium-nitrogen-containing compounds or reduced nitrogen fertilizers in the soil.

In the present specification and claims, the terms 3-amino-s-triazole, tetrazole, and 5-aminotetrazole are employed in the customary sense to designate heterocyclic compounds being of the following respective formulae:

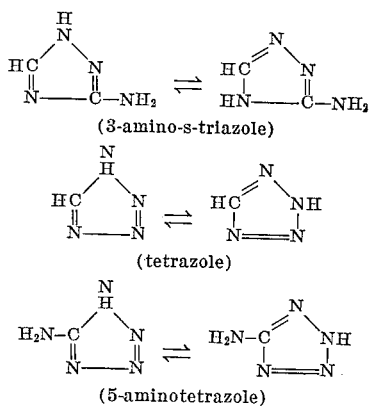

The compounds of the present invention are prepared by reacting the respective heterocyclic compound (3-amino-s-triazole, tetrazole, or 5-aminotetrazole) with hexafluoroarsenic or hexafluorophosphoric acid. Conveniently, the reaction is carried out in an inert liquid reaction medium, such as water or a loweralkanol. The reaction is exothermic and takes place smoothly at temperatures of from −10° to 80° C. Good results are obtained when substantially equimolecular amounts of the reactants are employed.

The hexafluoroarsenic or hexafluorophosphoric acid reactant is usually supplied to the reaction mixture as a liquid. Conveniently, the liquid employed is the commercial product which contains 65 percent $HAsF_6$, 21 percent $H_2O$, and 14 percent related arsenic acids, or the commercial product which contains 65 percent $HPF_6$, 21 percent $H_2O$, and 14 percent related phosphorus acids. In other procedures, a liquid containing one of the acids is prepared in the manner of Nuttall et al. in their preparation of an aqueous solution of hexafluorophosphoric acid. See the Journal of the Chemical Society (London), 1960, pages 4965–4970. In yet other procedures, it is sometimes convenient to supply the hexafluoroarsenic or hexafluorophosphoric acid reactant to the reaction as a hydrate.

In carrying out the reaction, the heterocyclic compound reactant is contacted with the acid in any conventional manner, conveniently, by adding one reactant to the other reactant. The temperature of the resulting reaction mixture can be controlled by regulating the rate of the contacting of the reactants as well as by external cooling. Upon completion of the contacting of the reactants, most of the reaction has taken place with production of the desired salt product as a precipitate in the reaction mixture. Where optimum yields are desired, it is often convenient that the reaction mixture be allowed to stand for a period of time. Upon completion of the reaction, the desired heterocyclic salt product can be separated from the reaction mixture by filtration or by removal of the inert liquid reaction medium. The removal of the reaction medium is conveniently accomplished by evaporation or distillation under subatmospheric pressure. The separated salt product can be employed for the useful purposes of the present invention or can be purified by conventional procedures such as washing with water or suitable organic liquid or recrystallization, to prepare a purified product which can also be employed for the useful purposes of the present invention.

The following examples set forth the best mode of the present invention now known by the inventor and will enable those skilled in the art to practice the present invention.

Example 1.—3-amino-s-triazole hexafluoroarsenate 40 grams of 3-amino-s-triazole (0.47 mole) were dispersed in 200 milliliters of methanol and the resulting dispersion heated to a temperature of about 65° C. and maintained at approximately 65° C. for 20 minutes. Thereafter, the heated dispersion was mixed with 100 grams of hexafluoroarsenic acid hexahydrate (equivalent to 0.46 mole of $HAsF_6$). The resulting reaction mixture was cooled to a temperature of about 0–5° C. and maintained within the temperature range of 0–5° C. for two hours; subsequently, the cooled solution was heated to a temperature of about 65° C. and maintained at about that temperature for several hours in order to facilitate the evaporation of a substantial portion of the methanol reaction medium and to obtain a concentrated reaction mixture. Thereafter, the concentrated reaction mixture was permitted to cool to room temperature and to stand at room temperature for about two days.

At the end of the two-day period, the concentrated reaction mixture had solidified as a 3-amino-s-triazole hexafluoroarsenate product residue. The product residue was washed with 20 milliliters of diethyl ether and the washed product residue dried in the presence of a dehydrating agent to obtain a purified product. The product is a white crystalline solid material melting at 86–91° C. The product has the following structural formula:

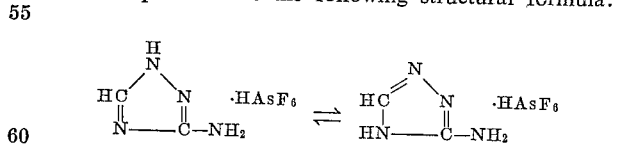

In a similar manner, other products of the present invention were prepared as follows:

From tetrazole and hexafluoroarsenic acid, a white crystalline tetrazole hexafluoroarsenate product having a molecular weight of 260 and melting at 79–83° C.

From 5-aminotetrazole and hexafluorophosphoric acid, 5-aminotetrazole hexafluorophosphate having a molecular weight of 231.

From 3-amino-s-triazole and hexafluorophosphoric acid, a white crystalline 3-amino-s-triazole hexafluorophosphate melting at 112–116° C.

From tetrazole and hexafluorophosphoric acid, tetrazole hexafluorophosphate product having a molecular weight of 216 and having the following structural formula:

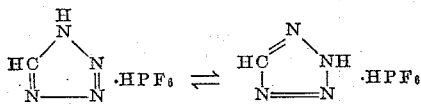

From 5-aminotetrazole and hexafluoroarsenic acid, 5-aminotetrazole hexafluoroarsenate product. The product is a white powder having a molecular weight of 275 and melting at 190–194° C.

When a product of the present invention is employed as a parasiticide, the unmodified product can be utilized. However, the present invention also encompasses the utilization of the product together with a parasiticide adjuvant. In such utilization, the product can be dispersed upon a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of wetting, dispersing, or emulsifying agents.

In representative operations, young cranberry bean plants (*Phaseolus vulgaris*) infested with known numbers of larvae of southern armyworm (*Prodenis eridania*) were wetted briefly with a treating composition containing as sole active agent 500 parts of 5-aminotetrazole hexafluoroarsenate per million parts, by weight, of ultimate composition. The plants were permitted to dry and thereafter held for a period of about 6 days under favorable agricultural conditions. At the end of the 6 day period, the plants were examined and there was found a 100 percent kill and control of southern armyworm larvae. Essentially the same results were obtained when employing a treating composition containing as sole active agent 3-amino-s-triazole hexafluorophosphate.

I claim:
1. Mono-salt of a member selected from the group consisting of hexafluoroarsenic acid and hexafluorophosphoric acid and a member selected from the group consisting of 3-amino-s-triazole, tetrazole, and 5-aminotetrazole.
2. 3-amino-s-triazole hexafluoroarsenate.
3. 3-amino-s-triazole hexafluorophosphate.
4. Tetrazole hexafluoroarsenate.
5. Tetrazole hexafluorophosphate.
6. 5-aminotetrazole hexafluoroarsenate.
7. 5-aminotetrazole hexafluorophosphate.

No references cited.

NICHOLAS S. RIZZO, *Primary Examiner.*